E. Reynolds,

Bending Wood,

No. 184, Reissued Jan. 1, 1851.

8972X RELATED DOC

AM. PHOTO-LI... OSBORNE'S PROCESS

UNITED STATES PATENT OFFICE.

EDWARD REYNOLDS, OF HADDONFIELD, NEW JERSEY.

IMPROVEMENT IN MACHINES FOR BENDING OR SETTING FELLIES FOR THE WHEELS OF CARRIAGES AND WAGONS.

8972X RELATED DOC

Specification forming part of Letters Patent No. ——— dated July 17, 1835; extended July 11, 1849; Reissue No. 184, dated January 1, 1851.

*To all whom it may concern:*

Be it known that I, EDWARD REYNOLDS, of Haddonfield, in the county of Gloucester and State of New Jersey, have invented certain new and useful Improvements in Machines for Binding or Setting the Fellies of Wheels for Carriages, &c.; and I do hereby declare that the following is a full, clear, and exact description of the principle or character which distinguishes them from all other things before known, and of the manner of constructing and using the same, reference being had to the accompanying drawings, making part of this specification, in which—

Figure 3:
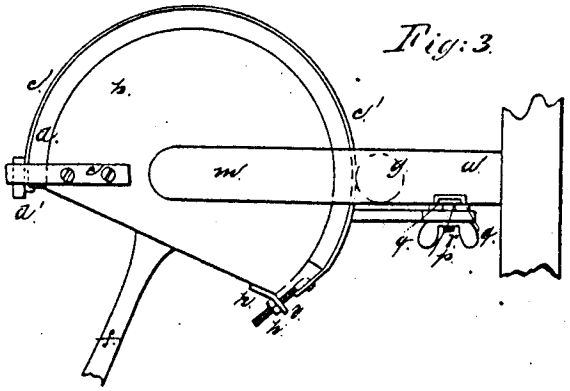
Figure 2:
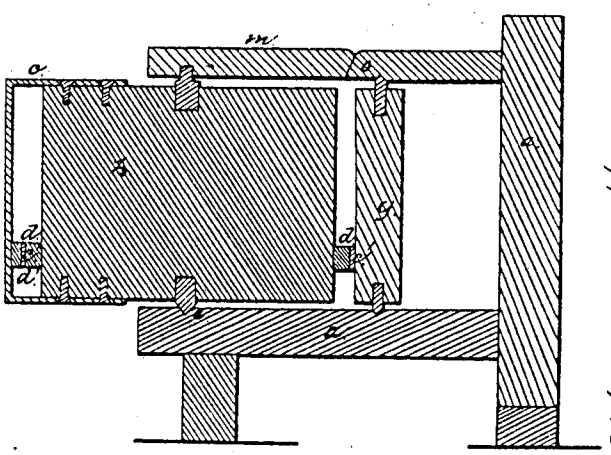
Figure 1:
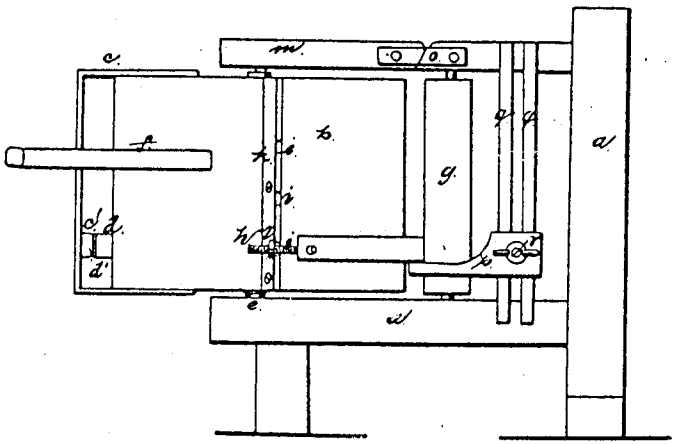

Figure 1 is an elevation of the machine; Fig. 2, a vertical section thereof, and Fig. 3 a plan of the machine.

The same letters indicate like parts in all the figures.

The object of my invention is to bend the fellies of wheels by machinery; and it consists in bending the wood, which has been properly prepared, by the use of a cylinder, or segment of one, in combination with an auxiliary friction-roller or its equivalent, between which and the cylinder the piece of wood to be bent is placed, one end being securely attached to the cylinder.

In the accompanying drawings, *a* represents a frame in which is placed the segmental cylinder *b*, upon which the wood is to be bent into a felly. The cylinder *b* is provided with a stirrup or piece of metal, *c*, between which and the cylinder the end of the piece of wood *d*, with the metal strap *c'*, is secured by a block, *d'*, or otherwise. The cylinder turns in a step, *e*, and is rotated on its axis by means of the lever *f*.

By the rotation of the cylinder the wood is bent to its shape—that is to say, circular. The strap of iron *c'*, bearing steadily against the external surface of the wood, prevents it from slipping, and the roller *g*, against which it bears, preventing the interior surface of the wood from leaving the surface of the cylinder. When the felly is bent into the shape required, it is secured by means of a rod, *h*, attached to the end of the strap *c'*, which has a screw-thread on its end, by which it is secured in one of the slots *i* in the metal piece *k*, attached to the opposite side of the cylinder by means of the nut *l*.

In the same manner the whole surface of the cylinder *b* may be covered with fellies, strapped and secured as described above.

When one cylinder is full, it is removed from the frame (the part *m* being hinged at *o* to admit of this) to allow the fellies to dry, and another cylinder of the same or different size takes its place, and the operation is continued as before.

The piece of iron *p*, which is adjustable on the ways *q q* by means of the screw *r*, is used to bear the under edge of the felly on while being bent, to prevent it from slipping longitudinally on the surface of the cylinder.

It is obvious that instead of having the cylinder upon which the felly is bent, as just described, to rotate on its axis it may remain stationary, and the piece of wood bent around it by attaching the wood to the cylinder by one end, and then causing the friction-roller in its frame to move round the cylinder, by which means fellies may be successfully bent, and still involve the principle of my invention.

What I claim as my invention, and desire to secure by Letters Patent, is—

The method, substantially as described, of bending fellies for carriages by means of a cylinder upon which the felly is bent, and a friction-roller, or its equivalent, against which it is bent, substantially as described, when used in connection with a strap for preventing the wood from splitting on its exterior surface or otherwise.

EDWARD REYNOLDS.

In presence of—

JOSEPH B. HEISHON,
JOHN THOMPSON.